United States Patent
Yanagawa et al.

(10) Patent No.: US 11,320,217 B2
(45) Date of Patent: May 3, 2022

(54) HEAT EXCHANGER AND METHOD OF MANUFACTURING THE SAME

(71) Applicant: UACJ Corporation, Tokyo (JP)

(72) Inventors: Yutaka Yanagawa, Aichi (JP); Norihisa Isomura, Aichi (JP); Yuki Totani, Aichi (JP); Yasuhiro Yagita, Aichi (JP); Tetsuro Hata, Aichi (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 16/988,903

(22) Filed: Aug. 10, 2020

(65) Prior Publication Data

US 2020/0370847 A1 Nov. 26, 2020

Related U.S. Application Data

(63) Continuation of application No. 15/385,342, filed on Dec. 20, 2016, now abandoned.

(30) Foreign Application Priority Data

Jan. 14, 2016 (JP) .................................. 2016-005554

(51) Int. Cl.
*F28F 3/06* (2006.01)
*F28F 21/08* (2006.01)
(Continued)

(52) U.S. Cl.
CPC ............ *F28F 21/084* (2013.01); *B23K 1/008* (2013.01); *B23K 1/0012* (2013.01); *B23K 1/19* (2013.01);
(Continued)

(58) Field of Classification Search
CPC .... F28F 21/084; F28F 21/089; F28F 2275/04; F28F 3/06; B23K 35/286; B23K 1/0012; H05K 7/20254; H05K 7/20309
See application file for complete search history.

(56) References Cited

U.S. PATENT DOCUMENTS

| 3,807,033 A | 4/1974 | Schoer et al. |
| 3,811,177 A | 5/1974 | Schoer et al. |

(Continued)

FOREIGN PATENT DOCUMENTS

| CN | 1298205 A | 6/2001 |
| CN | 1416377 A | 5/2003 |

(Continued)

OTHER PUBLICATIONS

Alcoa Mill Products, "Aluminum Brazing Sheet", May 2005, 4 pages.*

(Continued)

*Primary Examiner* — Leonard R Leo
(74) *Attorney, Agent, or Firm* — J-TEK Law PLLC; Jeffrey D. Tekanic; Scott T. Wakeman (57) ABSTRACT

A method for manufacturing a heat exchanger (1) includes joining an inner fin (3) to a hollow structure (20) formed from at least two clad plates (200a, 200b) by heating and brazing a filler metal layer (B). Each clad plate has a core layer (A) composed of an aluminum alloy that contains Mg: 0.40-1.0 mass %. The filler metal layer is composed of an aluminum alloy that contains Si: 4.0-13.0 mass %, and further contains Li: 0.0040-0.10 mass %, Be: 0.0040-0.10 mass %, and/or Bi: 0.01-0.30 mass %. The inner fin is composed of an aluminum alloy that contains Si: 0.30-0.70 mass % and Mg: 0.35-0.80 mass %. A flux (F) that contains cesium (Cs) is applied along a contact part (201), and the vicinity thereof, of the at least two clad plates prior to the heating. A heat exchanger (1) may be manufactured according to this method.

18 Claims, 2 Drawing Sheets

(51) Int. Cl.
  *B23K 1/00* (2006.01)
  *B23K 35/36* (2006.01)
  *B32B 15/01* (2006.01)
  *B23K 35/00* (2006.01)
  *B23K 35/02* (2006.01)
  *B23K 1/19* (2006.01)
  *B23K 1/20* (2006.01)
  *B23K 35/28* (2006.01)
  *B23K 1/008* (2006.01)
  *B23K 35/38* (2006.01)
  *H05K 7/20* (2006.01)
  *B23K 101/14* (2006.01)

(52) U.S. Cl.
  CPC ............ *B23K 1/203* (2013.01); *B23K 35/002* (2013.01); *B23K 35/025* (2013.01); *B23K 35/0222* (2013.01); *B23K 35/0233* (2013.01); *B23K 35/0238* (2013.01); *B23K 35/0244* (2013.01); *B23K 35/286* (2013.01); *B23K 35/288* (2013.01); *B23K 35/36* (2013.01); *B23K 35/3603* (2013.01); *B23K 35/3605* (2013.01); *B23K 35/383* (2013.01); *B32B 15/016* (2013.01); *F28F 3/06* (2013.01); *F28F 21/089* (2013.01); *B23K 2101/14* (2018.08); *F28F 2275/04* (2013.01)

(56) References Cited

U.S. PATENT DOCUMENTS

| | | |
|---|---|---|
| 3,853,547 A | 12/1974 | Singleton |
| 3,900,151 A | 8/1975 | Heinz et al. |
| 4,121,750 A | 10/1978 | Schoer et al. |
| 4,173,302 A | 11/1979 | Schultze et al. |
| 4,241,148 A | 12/1980 | Schoer et al. |
| 4,574,878 A | 3/1986 | Sugiyama et al. |
| 4,626,295 A | 12/1986 | Sasaki et al. |
| 4,645,119 A | 2/1987 | Haramaki et al. |
| 4,905,887 A | 3/1990 | Schoer et al. |
| 4,906,307 A | 3/1990 | Fujiyoshi |
| 4,991,647 A | 2/1991 | Kawabe et al. |
| 5,171,377 A | 12/1992 | Shimizu et al. |
| 5,232,788 A | 8/1993 | Timsit et al. |
| 5,316,206 A | 5/1994 | Syslak et al. |
| 5,418,072 A | 5/1995 | Baldantoni et al. |
| 5,450,666 A | 9/1995 | Conn et al. |
| 6,113,667 A | 9/2000 | Hyogo et al. |
| 6,234,243 B1 | 5/2001 | Murching et al. |
| 6,341,651 B1 | 1/2002 | Ohta |
| 2001/0040180 A1 | 11/2001 | Wittebrood et al. |
| 2002/0005230 A1 | 1/2002 | Watsuji et al. |
| 2002/0012811 A1 | 1/2002 | Wittebrood et al. |
| 2002/0037425 A1 | 3/2002 | Mooij et al. |
| 2002/0086179 A1 | 7/2002 | Wittebrood |
| 2002/0102431 A1 | 8/2002 | Wittebrood et al. |
| 2003/0051342 A1 | 3/2003 | Hasegawa et al. |
| 2003/0084569 A1 | 5/2003 | Hyogo et al. |
| 2003/0091856 A1 | 5/2003 | Wittebrood |
| 2003/0183376 A1 | 10/2003 | Abell et al. |
| 2004/0009358 A1 | 1/2004 | Scott et al. |
| 2004/0028940 A1 | 2/2004 | Toyama et al. |
| 2004/0121180 A1 | 6/2004 | Wittebrood et al. |
| 2004/0238605 A1 | 12/2004 | Nishimura et al. |
| 2005/0006065 A1 | 1/2005 | Katsumata et al. |
| 2005/0011636 A1 | 1/2005 | Miyachi et al. |
| 2005/0034848 A1 | 2/2005 | Ueda |
| 2005/0076506 A1 | 4/2005 | Kanada |
| 2005/0189047 A1 | 9/2005 | Hasegawa et al. |
| 2006/0000586 A1 | 1/2006 | Katsumata et al. |
| 2006/0102691 A1 | 5/2006 | Toyama et al. |
| 2006/0231170 A1 | 10/2006 | Parson et al. |
| 2007/0017605 A1 | 1/2007 | Nakamura et al. |
| 2007/0158386 A1 | 7/2007 | Dulac et al. |
| 2007/0251091 A1 | 11/2007 | Minami et al. |
| 2008/0003451 A1 | 1/2008 | Suzuki et al. |
| 2008/0047683 A1 | 2/2008 | Takahashi |
| 2009/0165893 A1 | 7/2009 | Akazawa et al. |
| 2009/0233118 A1 | 9/2009 | Katoh et al. |
| 2010/0051247 A1 | 3/2010 | Sogabe et al. |
| 2010/0112370 A1 | 5/2010 | Ueda et al. |
| 2010/0116472 A1 | 5/2010 | Katsumata et al. |
| 2010/0266871 A1 | 10/2010 | Matsuo et al. |
| 2011/0114228 A1 | 5/2011 | Nakamura et al. |
| 2011/0240280 A1 | 10/2011 | Izumi et al. |
| 2012/0145365 A1 | 6/2012 | Yamashita et al. |
| 2012/0177947 A1 | 7/2012 | Abrahamsson et al. |
| 2013/0118013 A1 | 5/2013 | Yamashita et al. |
| 2013/0299564 A1 | 11/2013 | Steiner et al. |
| 2013/0306714 A1 | 11/2013 | Wittebrood |
| 2014/0182821 A1 | 7/2014 | Perrin et al. |
| 2014/0186560 A1 | 7/2014 | Katsumata et al. |
| 2014/0308541 A1 | 10/2014 | Kitawaki et al. |
| 2014/0360712 A1 | 12/2014 | Fujita et al. |
| 2015/0068713 A1 | 3/2015 | Sucke et al. |
| 2015/0118517 A1 | 4/2015 | Itoh et al. |
| 2015/0239071 A1 | 8/2015 | Kiga |
| 2015/0273635 A1 | 10/2015 | Kumagai et al. |
| 2016/0097607 A1 | 4/2016 | Katsumata et al. |
| 2016/0332209 A1 | 11/2016 | Yamashita et al. |
| 2017/0151637 A1 | 6/2017 | Ichikawa et al. |
| 2017/0205159 A1 | 7/2017 | Yamashita et al. |
| 2017/0320170 A1 | 11/2017 | Yanagawa et al. |
| 2018/0133845 A1 | 5/2018 | Itoh et al. |

FOREIGN PATENT DOCUMENTS

| | | |
|---|---|---|
| CN | 1572407 A | 2/2005 |
| CN | 1886527 A | 12/2006 |
| CN | 101871062 A | 10/2010 |
| CN | 102003841 A | 4/2011 |
| CN | 102205676 A | 10/2011 |
| CN | 102803891 A | 11/2012 |
| CN | 103097850 A | 5/2013 |
| DE | 19744734 A1 | 4/1999 |
| DE | 102008009695 A1 | 9/2008 |
| DE | 202012003090 U1 | 4/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| JP | S53131253 A | 11/1978 |
| JP | S6182992 A | 4/1986 |
| JP | 61293699 | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H1180870 A | 3/1999 |
| JP | H11183085 A | 7/1999 |
| JP | H11221696 A | 8/1999 |
| JP | H11285817 A | 10/1999 |
| JP | H11335764 A | 12/1999 |
| JP | H11347783 A | 12/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 3160099 B2 | 4/2001 |
| JP | 3212927 B2 | 9/2001 |
| JP | 2002079370 A | 3/2002 |

(56) References Cited

FOREIGN PATENT DOCUMENTS

| | | |
|---|---|---|
| JP | 2002161323 A | 6/2002 |
| JP | 2002267382 A | 9/2002 |
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2004084060 A | 3/2004 |
| JP | 2004330233 A | 11/2004 |
| JP | 2005060790 A | 3/2005 |
| JP | 2005523163 A | 8/2005 |
| JP | 2005256166 A | 9/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007031730 A | 2/2007 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008006480 A | 1/2008 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |
| JP | 2010247209 A | 11/2010 |
| JP | 2010255014 A | 11/2010 |
| JP | 2011000614 A | 1/2011 |
| JP | 2011136358 A | 7/2011 |
| JP | 2011247459 A | 12/2011 |
| JP | 2012067994 A | 4/2012 |
| JP | 2013189659 A | 9/2013 |
| JP | 2013233552 A | 11/2013 |
| JP | 2014050861 A | 3/2014 |
| JP | 2014083570 A | 5/2014 |
| JP | 2014226704 A | 12/2014 |
| WO | 2010147170 A1 | 12/2010 |
| WO | 2011034496 A2 | 3/2011 |
| WO | 2012104147 A1 | 8/2012 |
| WO | 2016017716 A1 | 2/2016 |

OTHER PUBLICATIONS

"Aluminum—Magnesium—Silicon (6000) Alloys", published May 2003, found at: http://www.totalmateria.com/Article74.htm.

Brazing of Stainless Steel to Aluminium for Pots and Pans Production, Oct. 2010, webpage found at: http://www.aluminium-brazing.com/2010/10.

Elkem Bremanger, Result Analysis Report for Silgrain 10 micron dated Aug. 20, 2008.

Office Action from the Korean Patent Office dated Mar. 28, 2018 in related Korean application No. 10-2016-018208, and machine translation thereof.

English translation of the International Search Report dated Oct. 4, 2016 for related application No. PCT/JP2016/064777.

English translation of the Written Opinion of the International Searching Authority dated Oct. 4, 2016 in related application No. PCT/JP2016/064777.

Extended European Search Report from the European Patent Office dated Aug. 7, 2017 in related EP application No. 17150415.2, including European Search Opinion, European Search Report, and examined claims 1-15.

Malvern White Paper entitled "A Basic Guide to Particle Characterization", 2015, webpage found at: http://www.malvern.com/en/support/resource-center/Whitepapers/WP120620BasicGuidePartChar.aspx.

J.R. Davis, "Aluminum and Aluminum Alloys", Pages from the third edition of ASM Specialty Handbook, ASM International, 1993.

Office Action from the Japanese Patent Office dated Feb. 21, 2017 in related Japanese application No. 2016-005554, and translation of substantive portions thereof.

Office Action from the Japanese Patent Office dated Sep. 27, 2016 in related Japanese application No. 2016-005554, and translation of substantive portions thereof.

Office Action from the Chinese Patent Office dated Aug. 30, 2018 in related Chinese application No. 201610943693.7, and machine translation thereof.

Nocolok® Sil Flux fg brochure, 2015, webpage found at: http://www.aluminium-brazing.com/sponsor/nocolok/Files/PDFs/31360.pdf.

* cited by examiner

HEAT EXCHANGER AND METHOD OF MANUFACTURING THE SAME

CROSS-REFERENCE

This application is a continuation application of U.S. application Ser. No. 15/385,342 filed on Dec. 20, 2016, now abandoned, which claims priority to Japanese patent application no. 2016-5554 filed on Jan. 14, 2016, the contents of which are fully incorporated herein by reference.

TECHNICAL FIELD

The present invention relates to a heat exchanger and to a method of manufacturing the same.

BACKGROUND ART

Inverter units are used in various applications such as in the control of a drive motor of, for example, a hybrid automobile, an electric vehicle, or the like. An inverter unit comprises a semiconductor (switch) device, such as an IGBT (insulated gate bipolar transistor), and a heat exchanger for cooling the semiconductor device as well as other heat-generating elements (bodies) such as electronic parts that constitute the power conversion circuit.

Such a known heat exchanger comprises a hollow structure having an outer surface defining a mounting surface, on which a heat-generating element (body) is mounted, and an inner fin housed in the interior of the hollow structure. The hollow structure and the inner fin are often formed from an aluminum plate, an aluminum-alloy plate, or the like, which has high thermal conductivity and a low specific gravity. In addition, the inner fin is affixed to the hollow structure via metallic joints (fillets) by being brazed to an inner surface of the hollow structure.

The brazing of the heat exchanger is performed using clad plates, which have a core composed of aluminum or an aluminum alloy, and a filler material (filler metal) clad on one side or both sides of the core. One known method for brazing a heat exchanger is the so-called NOCOLOK® flux brazing process, in which a K—Al—F (potassium aluminum fluoride)-based flux is applied to the parts to be joined.

In recent years, there has been a demand for reducing the size and weight of heat exchangers, and in particular there has been strong demand for reducing the size and weight of automobile heat exchangers. In addition, because the amount of heat generated by semiconductor devices has increased in accordance with the higher output of recently-developed power converters, it has become difficult to prevent deformation of the hollow structure, the inner fin, and the like caused by thermal expansion of one or more of the components of the heat exchanger. Accordingly, to reduce the size and weight of heat exchangers while also preventing deformation caused by thermal expansion, plate materials of greater strength and thinner plate thickness are being studied for use in the hollow structure, the inner fin, and the like. To increase the strength of a plate material and reduce plate thickness, it is effective to add Mg (magnesium) to the aluminum alloy of the plate material.

It is important to note that, if an aluminum alloy that contains Mg is subjected to the NOCOLOK® flux brazing process, then the flux will be consumed during the brazing as it reacts with the Mg due to the heating. Consequently, oxide films present on the surfaces of the parts to be joined cannot be sufficiently broken up (disrupted or removed) by the flux. In addition, compounds generated by the reaction between the K—Al—F-based flux and Mg cause the fluidity of the filler material to decrease. Thus, because some of the flux is consumed by the undesirable reaction with Mg and the fluidity of the filler material is disadvantageously decreased, brazing of aluminum alloys that contain Mg has been problematic using the NOCOLOK® flux brazing process.

To address this problem, various techniques have been proposed in which an aluminum alloy that contains Mg is subjected to brazing without using any flux. For example, Japanese Laid-open Patent Publication No. 2004-25297 and its counterpart US 2004/238605 describe a technique in which a hollow structure is formed from an aluminum-alloy brazing sheet. Mg is added to a core layer of the brazing-sheet that is not a part of the filler-material layer, and the brazing is performed in an inert-gas atmosphere without applying flux to the inner sides (interior) of the hollow structure. However, a K—Al—F-based flux may applied to an exterior surface of the hollow structure in order to break up oxide films on the exterior surface of the hollow structure that will be joined by brazing to another structure, e.g., to the exterior surface of another hollow structure.

As another example, Japanese Laid-open Patent Publication No. 2013-233552 and its counterpart US 2015/118517 disclose a technique that uses brazing sheets, which comprise a filler material composed of an Al—Si (aluminum-silicon) alloy to which Li (lithium) has been added, and a core composed of an aluminum alloy to which Mg has been added, and the brazing is performed in an inert-gas atmosphere without using flux.

SUMMARY OF THE INVENTION

However, in the technique of JP 2004-25297, the K—Al—F-based flux that is applied to an exterior portion (surface) of the hollow structure will melt during the brazing and may penetrate (seep or creep), due to capillary action, through a contact (to be joined) part of the hollow structure and thus into the interior of the hollow structure. In this case, the melted K—Al—F-based flux may contact Mg on the surface of the inner fin and consume it without breaking up the oxide film on the inner fin and/or interior surface of the hollow structure, thereby inhibiting the intended fluxless brazing of the inner fin to the hollow structure. However, because only a relatively small amount of the melted flux will penetrate into the interior of the hollow structure, insufficient melted flux reaches the inner fin to break up (destabilize or disrupt) the oxide films on the inner fin and/or the portion of the interior surface of the hollow structure that contacts the inner fin prior to formation of the fillets. Therefore, the technique of JP 2004-25297 is problematic, because unstable fillets may form at the parts to be joined inside the hollow structure, such as, e.g., the interior surface (s) of the hollow structure that will be joined with the inner fin, due to the impairment of the brazing process caused by the insufficiently broken-up oxide films.

In addition, the technique of JP 2013-233552 is problematic in that brazeability degrades if the brazing atmosphere has a relatively high concentration of oxygen. Consequently, if the technique of JP 2013-233552 is applied in a mass-production facility, brazeability may degrade depending on the shape, the structure, or the like of the object to be processed (brazed) and on the location at which the brazed joint is formed.

That is, because the atmosphere (gases) outside of the hollow structure is impeded from flowing (diffusing) into the interior of the hollow structure and vice versa, a low oxygen concentration can be maintained within the hollow structure relatively easily throughout the heating step. Therefore, with respect to the parts to be joined located in the interior of the hollow structure, such as, for example, the portions (surface (s)) of the hollow structure that will be joined with the inner fin, a satisfactory brazed joint (fillets) can be formed without using flux. On the other hand, because the oxygen concentration inside the brazing furnace typically fluctuates during the brazing process owing to various factors, it is difficult to constantly maintain a low oxygen concentration outside of the hollow structure throughout the entire brazing process. Consequently, the brazeability of parts on the exterior of the hollow structure that are directly exposed to the brazing furnace atmosphere, such as, e.g., portions of the outer walls (contact part) of the hollow structure that will be joined to each other, tends to degrade. Furthermore, because the parts of the outer walls of the hollow structure that will be joined to each other have a structure that permits melted (liquid) filler material (filler metal) to distribute (flow) between the interior and the exterior of the hollow structure, the filler material tends to collect inside the hollow structure, thereby providing strong brazed joints (fillets) in the interior of the hollow structure. However, this means there is a risk that an insufficient amount of the filler material will remain on the outer side (exterior) of the hollow structure, thereby leading to inferior brazed joints and possible brazing failures (defects), such as tearing of fillets, on exterior portions of the hollow structure.

As described above, to manufacture a heat exchanger using an aluminum alloy that contains Mg, it is necessary to improve both the brazeability of the portions of the hollow structure that will be joined with the inner fin and the brazeability of the portions of the outer walls (contact part) of the hollow structure that will be joined together.

It is therefore an object of the present teachings to disclose a more compact, lighter heat exchanger that undergoes little or no deformation due to thermal expansion, as well as to disclose a method for manufacturing a heat exchanger.

In one non-limiting embodiment of the present teachings, a method for manufacturing a heat exchanger comprises: preparing clad plates that each comprise: a core layer having a chemical composition that contains Mg (magnesium): 0.40-1.0 mass %, the remainder being Al (aluminum) and unavoidable impurities; and a filler-material (filler metal) layer having a chemical composition that contains Si (silicon): 4.0-13.0 mass % and further contains one, two or more elements selected from Li (lithium): 0.0040-0.10 mass %, Be (beryllium): 0.0040-0.10 mass %, and Bi (bismuth): 0.010-0.30 mass %, the Mg content being restricted to less than 0.10 mass % and the remainder being composed of Al and unavoidable impurities, the filler-material layer being clad onto at least one surface of the core layer; preparing an inner fin having a chemical composition that contains Si: 0.30-0.70 mass % and Mg: 0.35-0.80 mass %, the remainder being Al (aluminum) and unavoidable impurities; assembling an object to be processed (brazed) comprising: a hollow structure constituted from the clad plates, in which the filler-material layers are disposed on inner sides, and that has a contact part at which the filler-material layers of the respective clad plates contact one another; the inner fin, which is housed in the interior of the hollow structure; and a flux, which contains Cs (cesium) and is applied to the contact part and the vicinity thereof; and collectively brazing the hollow structure and the inner fin by heating the object to be processed in an inert-gas atmosphere to melt the flux and the filler-material layer.

In another non-limiting embodiment of the present teachings, a heat exchanger comprises: a jacket constituted from plate materials having a chemical composition that contains Mg: 0.40-1.0 mass %, the remainder being Al and unavoidable impurities, wherein a heat-generating-element mounting surface, on which a heat-generating element is mounted, is provided (defined) on an outer surface of the jacket, and a coolant passageway, through which a coolant circulates, is provided (defined) in the interior of the jacket; an inner fin, which is composed of an aluminum alloy and is disposed in the coolant passageway; a jacket junction, which is composed of an Al—Si alloy, at which the plate materials of the jacket are joined to one another; and fin junctions, which are composed of an Al—Si alloy, at which the jacket and the inner fin are joined; wherein cesium (Cs) is present on an inner surface of the jacket only from the jacket junction and to the inner fin.

According to certain embodiments of the present teachings, the heat exchanger comprises the jacket and the inner fin, which is disposed in the coolant passageway defined within the jacket. If the jacket is composed of an aluminum alloy that contains Mg, the strength of the jacket can be made higher than jackets of previously known heat exchangers that do not contain Mg (or contain little Mg). Therefore, the size and wall thickness of the jacket can be reduced while still satisfying strength requirements (specifications) for the jacket. In addition, by increasing the strength of the metallic material (plate) forming the jacket, deformation of the jacket caused by thermal expansion during operation of the heat exchanger can be prevented or at least substantially reduced.

According to certain embodiments of the present teachings, the heat exchanger can be manufactured by heating the object to be processed (brazed), which has the above-described specific configuration, in an inert-gas atmosphere. A flux containing Cs (cesium) is applied to the contact part of the hollow structure of the object to be processed (brazed) and the vicinity thereof. The flux melts due to the heating when brazing is performed, and thereby can break up (destabilize, disrupt or eliminate) the oxide films present on the contact part. Therefore, by using such a flux containing cesium, brazing of the contact part can be effectively performed. Herein, the term "contact part" means a location, typically on or adjacent to an outer surface of the jacket (hollow structure), where two or more clad plates contact and where it is intended to form a brazed joint (fillet).

According to certain embodiments of the present teachings, the clad plates that constitute the hollow structure may comprise: the core layer composed of an aluminum alloy that contains Mg and the filler-material (filler metal) layer composed of an aluminum alloy that contains one or more of Li, Be, and Bi. When the brazing is performed, some of the Mg in the core layer diffuses and migrates into the surfaces (i.e. into the filler-material layer) of the clad plates owing to the heating. Then, the Mg that has migrated to into the filler-material layer and the Li, Be and/or Bi in the filler-material layer will coexist in the filler material layer, and act (cooperate) to effectively break up (disrupt or dissolve) the oxide films present on the surfaces of the clad plates, the surfaces of the inner fin, and the like. Consequently, by heating the above-mentioned object to be processed (brazed) in the inert-gas atmosphere, the oxide films present in the interior of the hollow structure can be sufficiently broken up and the hollow structure can be reliably joined (brazed) to the inner fin without using any flux.

The flux that is disposed at (on) the contact part and melts due to the heating when brazing is performed may penetrate (seep or creep) into the interior of the hollow structure. However, because the inner fin is disposed in the interior of the hollow structure, at least a majority of (or nearly all of) the flux that penetrates into the interior of the hollow structure can be stanched (blocked) by an outermost fin plate of the inner fin, as will be explained in further detail below. In addition, compared with the above-described known K—Al—F-based flux, degradation in (impairment of) brazeability, which can be caused by the K—Al—F-based flux reacting with Mg, tends not to occur with a flux that contains Cs. Consequently, brazing of the hollow structure to the inner fin is not impeded by such a flux even if such flux reaches the contact points of the inner fin with the interior surface of the hollow structure.

In certain embodiments of the present teachings, the object to be processed (brazed) may be heated in an inert-gas atmosphere and the brazing can be performed without using any flux in the interior of the hollow structure where the oxygen concentration is comparatively low. On the other hand, the brazing can be performed using a flux according to the present teachings on the outside (exterior) portions of the hollow structure where the oxygen concentration may be comparatively high during the brazing process. As a result, durable and robust heat exchangers having strong, effective brazed joints (fillets) both within the interior and around the exterior of the heat exchanger can be easily prepared.

DETAILED DESCRIPTION

In a representative heat exchanger manufacturing method according to the present teachings, the object to be processed (brazed) includes clad plates, an inner fin, and flux, which will be explained in detail below.

Clad Plates

The clad plates each have a core layer and a filler-material layer (filler metal layer), clad onto at least one surface of the core layer. It is noted that the core layer, after brazing has been performed, becomes a plate material that constitutes the jacket of the heat exchanger.

Core Layer

Each core layer preferably has a chemical composition that contains Mg: 0.40-1.0 mass %, optional elements or additives (if present, as described below), the remainder (balance) being Al and unavoidable impurities.

Mg: 0.40-1.0 mass %

When Mg is present in the core layer, it functions to increase the strength of the clad plate. By setting the amount of Mg in the core layer to 0.40-1.0 mass %, it becomes possible to thin the clad plates and, in turn, thin the jacket, to thereby produce a lighter heat exchanger having the same durability as a heat exchanger having a thicker jacket with no or little Mg in the jacket. In addition, during the brazing some of the Mg in the core layer diffuses into the filler material (filler metal) owing to the heating and migrates to the surface of the clad plate. Then, any Mg that reaches the surface of the clad plate acts to break up (disrupt or dissolve) the oxide film present on or in contact with the inner side (surface) of the hollow structure, such as the oxide films present on the surfaces of the clad plates, the inner fin, and the like.

By setting the amount of Mg in the core layer to 0.40-1.0 mass %, the hollow structure can be more effectively joined to the inner fin by brazing. If the Mg content in the core layer is less than 0.40 mass %, it becomes difficult to thin the jacket while maintaining sufficient strength in the jacket and there is a risk that the hollow structure will not be effectively joined (brazed) to the inner fin. Accordingly, to avoid such problems, the Mg content of the core layer is set to 0.40 mass % or more.

After the filler-material layer has melted due to the heating when brazing is performed, Mg in the core layer rapidly diffuses into the liquid filler material and reaches the surface of the clad plate. However, if an excessive amount of Mg reaches the surface, then reaction products from the Mg and the flux, which was applied to the contact part of the hollow structure (hereinbelow, the contact part of the hollow structure is abbreviated as "contact part"), may be produced in large amounts and these reaction products may act to decrease the fluidity of the filler material, thereby degrading the brazeability of the contact part. Therefore, to avoid such problems, the Mg content is set to 1.0 mass % or less, preferably 0.80 mass % or less.

Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less The core layer may optionally further contain one, two or more elements selected from Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less. By adding one or more these elements to the core layer, the strength, the corrosion resistance, etc. of the clad plates can be increased in accordance with the particular application of the present teachings. However, it is noted that, if the content of these elements becomes excessively large, then there is a risk that the clad plates will tend to break in the rolling process when preparing the clad plates.

Filler-Material (Filler Metal) Layer

The filler-material layer has a chemical composition that contains Si (silicon): 4.0-13.0 mass % and further contains one, two or more elements selected from Li (lithium): 0.0040-0.10 mass %, Be (beryllium): 0.0040-0.10 mass %, and Bi (bismuth): 0.010-0.30 mass %, as well as optional elements (if present, as described below), the Mg (magnesium) content being restricted to less than 0.10 mass % and the remainder (balance) being Al and unavoidable impurities.

Si: 4.0-13.0 mass %

By setting the Si content to 4.0-13.0 mass %, it is possible to supply, during the heating while brazing, a sufficient amount of the melted filler material to the contact part and to the portions of the inner fin that will be joined with the hollow structure. As a result, both the brazeability of the contact part and the brazeability of the inner fin to the hollow structure can be improved.

If the Si content is less than 4.0 mass %, then problems may occur, such as a reduction of the fluidity of the filler material that causes the amount of the melted filler material supplied to the brazed joint to be insufficient, thereby impairing the durability, strength, etc. of the brazed joint (fillet). To avoid a degradation in brazeability, the Si content is set to 4.0 mass % or more, preferably 7.5 mass % or more. On the other hand, if the Si content is more than 13.0 mass %, then an excessive amount of melted filler material may be supplied to the brazed joint, and there is also a risk that too much Si will dissolve into the core layer. To avoid such problems, the Si content is set to 13.0 mass % or less, preferably 10.0 mass % or less.

Li: 0.0040-0.10 mass %, Be: 0.0040-0.10 mass %

Li and Be function to break up (disrupt, dissolve) the oxide films present on the surfaces of the hollow structure, the inner fin, and the like. The mechanism by which Li and Be break up the oxide films is not clear at the present time, but it is believed that the oxide films are broken up by the following mechanism. Without being bound to theory, it is believed that, because both Li and Be are elements that oxidize more easily (readily) than Al, they scavenge oxygen from the oxide films present on the surfaces of the object to be treated. This oxygen scavenging causes the oxygen-scavenged oxide films to become more fragile as compared to before oxygen scavenging, thereby generating cracks in the oxide films that cause the oxide films to break up.

In addition, because the Li and Be do not react at all with the flux, the brazing of the contact part is virtually unaffected by the presence of the Li and Be even though a flux is used along the contact part.

Furthermore, by setting the Li content to 0.0040-0.10 mass %, brazeability of the hollow structure with the inner fin can be improved. If the Li content is less than 0.0040 mass %, then the effect of the oxide films being broken up decreases, and there is a risk that brazeability of the hollow structure with the inner fin will degrade. To improve the brazeability of the hollow structure with the inner fin, the Li content is set to 0.0040 mass % or more, preferably 0.010 mass % or more. On the other hand, if the Li content is more than 0.10 mass %, then Li oxides grow on the surfaces of the filler-material layers of the clad plates, and there is a risk that such Li oxides will lead to degradation in brazeability. To avoid such problems, the Li content is set to 0.10 mass % or less, preferably 0.050 mass % or less.

Similar to the Li, by setting the Be content to 0.0040-0.10 mass %, brazeability of the hollow structure with the inner fin can be improved. If the Be content is less than 0.0040 mass %, then the effect of the oxide films being broken up decreases, and there is a risk that brazeability of the hollow structure with the inner fin will degrade. To improve the brazeability of the hollow structure with the inner fin, the Be content is set to 0.0040 mass % or more, preferably 0.010 mass % or more. On the other hand, if the Be content is more than 0.10 mass %, then Be oxides grow on the surfaces of the filler-material layers, and there is a risk that such Be oxides will impair brazeability. To avoid such problems, the Be content is set to 0.10 mass % or less, preferably 0.050 mass % or less.

Bi: 0.010-0.30 mass %

Bi functions to make the oxide films present on the surfaces of the aluminum material fragile. By providing a filler material (filler metal) layer in which Bi coexists with Mg and optionally Li and/or Be, breakup of the oxide films is promoted by these elements and, in turn, brazeability can be improved. In addition, because Bi acts to decrease the surface tension of the melted filler material, the melted filler material tends to flow more readily into fine (minute) gaps in the object to be processed. As a result, the reliability (durability) and strength of the brazed joint (fillet) can be improved.

By setting the Bi content to 0.010-0.30 mass %, brazeability of the contact part, brazeability of the hollow structure with the inner fin, and the reliability (durability) and strength of the brazed joints formed at these locations can be improved. If the Bi content is less than 0.010 mass %, then there is a risk that the effect of improving brazeability, increasing the reliability (durability) and strength of the brazed joints, and the like will no longer be sufficiently obtained. To improve the brazeability, the reliability (durability) and strength of the brazed joints, and the like, the Bi content is set to 0.010 mass % or more. On the other hand, if the Bi content is more than 0.30 mass %, then it is difficult to obtain the effect of improving brazeability commensurate with the amount of Bi. That is, the improvement in brazeability saturates at about 0.30 mass % Bi. In addition, if the Bi content is excessively large, then there is a risk that the surfaces of the filler-material layers will become discolored, and, depending on the particular application of the present teachings, there is a risk that such will lead to degradation in brazeability. To avoid such problems, the Bi content is set to 0.30 mass % or less, preferably 0.10 mass % or less.

Mg: less than 0.10 mass %

Any Mg in the filler-material layer may react with the flux and thereby consume the flux, thereby decreasing the ability of the flux to break up the oxide films. In addition, the reaction products of the Mg with the flux decrease the fluidity of the melted filler material. Consequently, if too much Mg is present in the filler-material layer, then there is a risk that it will lead to degradation in brazeability. To prevent degradation in brazeability, the Mg content in the filler-material layer is set to less than 0.10 mass %. However, it is noted that the Mg content is preferably as little (low) as possible in the filler-material layer and more preferably is restricted to 0.05 mass % or less.

The filler-material layer may optionally further contain one, two or more elements selected from the group consisting of Sr (strontium): 0.0020-0.050 mass %, Sb (antimony): 0.0030-0.070 mass %, Fe (iron): 0.050-0.80 mass %, Mn (manganese): 0.050-0.20 mass %, Ti (titanium): 0.010-0.15 mass %, Cu (copper): 0.50-5.0 mass %, and Zn (zinc): 0.90-6.0 mass %.

Sr: 0.0020-0.050 mass %, Sb: 0.0030-0.070 mass %, Fe: 0.050-0.80 mass %, Mn: 0.050-0.20 mass %, and Ti: 0.010-0.15 mass %

By setting the content of these elements in the filler-material layer to within the above-specified ranges, the fluidity of the filler material can be adjusted and brazeability can be further improved.

Cu: 0.50-5.0 mass % and Zn: 0.90-6.0 mass %

By setting the content of these elements in the filler-material layer to within the above-specified ranges, the electric potential of the filler-material layer can be adjusted and the corrosion resistance of the clad plate can be further improved.

Inner Fin

Fins having various shapes, such as, for example, a plate fin, a pin fin, a corrugated fin, or the like, can be used as the inner fin of the present teachings. The inner fin is preferably configured such that, when it is housed in the interior the hollow structure, it makes surface contact with inner surfaces of the hollow structure. In this case, it is possible to further increase the effect of stanching the flow of any melted flux that has penetrated (seeped, creeped) into the interior of the hollow structure from the contact part of the hollow structure. As a result, brazeability of the inner fin with the hollow structure can be further improved.

If the inner fin is configured such that it makes line contact with the hollow structure, then the contact-surface area of the inner fin with the hollow structure is decreased as compared to the surface contact described above in the background section. Consequently, there is a risk that the inner fin may not be sufficiently thick to stanch the flux. In this case, melted flux can more easily penetrate (seep, creep) into the interior of the inner fin. Furthermore, there is a risk that any melted flux that has reached the interior of the hollow structure will impede the oxide-dissolving function of Mg and the like and impair the brazeability of the inner fin with the hollow structure.

The inner fin is constituted from an aluminum alloy having a chemical composition that contains Si: 0.30-0.70 mass %, Mg: 0.35-0.80 mass %, and optional elements (if present, as described below), the remainder (balance) being Al and unavoidable impurities.

Si: 0.30-0.70 mass %

By setting the Si content to 0.30-0.70 mass %, diffusion of Si from the filler-material layer to the inner fin can be prevented during heating when brazing is performed. As a result, a decrease in the amount of Si in the filler-material layer can be prevented and brazeability of the hollow structure with the inner fin can be improved. Furthermore, by setting the Si content to 0.30-0.70 mass %, the strength of the inner fin can be increased.

If the Si content is less than 0.30 mass %, then there is a risk that the amount of Si in the filler-material layer will decrease owing to diffusion of Si from the filler-material layers into the inner fin, thereby leading to degradation in brazeability.

On the other hand, if the Si content is more than 0.70 mass %, then there is a risk that the melting point of the aluminum alloy that constitutes the inner fin will decrease. Consequently, depending on the particular application of the present teachings, there is a risk that the inner fin may (partially) melt during heating when brazing is performed, thereby leading to a decrease in brazeability.

Mg: 0.35-0.80 mass %

If melted flux penetrates into the interior of the hollow structure, then Mg in the inner fin will react with the flux and reaction products will be generated. These reaction products tend to reduce the fluidity of the melted (liquid) flux. Consequently, by setting the Mg content in the inner fin to 0.35-0.80 mass %, the effect of stanching the flow of any melted flux that has penetrated into the interior of the hollow structure can be improved, thereby improving brazeability of the inner fin with the hollow structure (where fluxless brazing is preferable). In addition, by setting the Mg content in the inner fin to 0.35-0.80 mass %, the strength of the inner fin can be increased.

If the Mg content is less than 0.35 mass %, then the strength of the inner fin may not be sufficiently increased and the inner fin may not sufficiently stanch the flow of melted flux, as described above.

If the Mg content is more than 0.80 mass %, then there is a risk that, during heating when brazing is performed, Mg oxides will thickly aggregate on the surfaces of the inner fin. In this case, there is a risk that the Li, Be and/or Bi contained in the filler-material layers of the clad plates will insufficiently break up the oxide films and the diffusion of Mg from the core layer to the surface will no longer be sufficient. As a result, there is a risk that the brazeability of the hollow structure with the inner fin will be impaired.

Mn: 0.050-1.30 mass %, Fe: 1.0 mass % or less, Cu: 0.90 mass % or less, Zn: 6.5 mass % or less, Ti: 0.20 mass % or less, and Zr: 0.50 mass % or less The inner fin may optionally further contain one, two or more elements selected from the group consisting of Mn: 0.050-1.30 mass %, Fe: 1.0 mass % or less, Cu: 0.90 mass % or less, Zn: 6.5 mass % or less, Ti: 0.20 mass % or less, and Zr: 0.50 mass % or less. By adding one or more of these elements, the strength, corrosion resistance, and the like of the inner fin can be increased. It is noted that, if the content of these elements is excessively large, then there is a risk that cracks will form when preparing the inner fin by extrusion or rolling.

Flux

According to the present teachings, a flux that preferably contains cesium (Cs) is applied to the contact part of the hollow structure. As one non-limiting example, $CsAlF_4$ may be used alone. In the alternative, a flux contain Cs, such as $CsAlF_4$, may be used in combination with $K_{1-3}AlF_{3-6}$; an example of such a combined flux is sold as NOCOLOK® Cs Flux by Solvay Fluor GmbH. Generally speaking, a flux is designed to melt at a temperature lower than the temperature at which the filler-material (filler metal) layers melt, so that the melted (liquid) flux acts to break up (disrupt, dissolve) the oxide films present on the surfaces of the contact part. At this time, little or none of the Mg in the core layers has reached the surfaces of the clad plates (i.e. the surfaces of the contact part). Therefore, because the melted flux does not react with Mg that has diffused from the core layers, the melted flux can effectively break up the oxide films present on the surfaces of the filler-material layers located at the contact part.

In addition, if some of the melted flux penetrates (seeps, creeps) from the contact part (contact point of the clad plates) into the interior of the hollow structure, then the liquid flux might further migrate to the interior of the inner fin by flowing along the surfaces of the clad plates. However, any such liquid flux will gradually react with Mg that has diffused from the core layers into the surfaces (melted filler material layers) of the clad plates, and consequently the fluidity of the liquid flux will gradually decrease as it flows (distributes) along the surface of the clad plate, thereby preventing or restricting the flux from reaching the outermost portion of the inner fin.

However, even if some of the flux reaches the outermost plate of the inner fin, most or all of the flux will be stanched or blocked by the outermost plate of inner fin, as described above, due to the presence of Mg in the inner fin. As a result, brazing of the hollow structure with the inner fin can still be effectively performed without any flux in the interior of the inner fin even if some of the flux penetrates from the contact part into the interior of the hollow structure.

For example, a Cs—Al—F-based compound, such as cesium fluoroaluminate, can be used as the flux that is applied to the contact part of the hollow structure. Optionally, another flux compound that does not contain Cs, such as, for example, a K—Al—F-based flux or the like, also may be included in the flux, as long as the amount of the other flux compound is in a range such that it does not degrade brazeability. The flux may be formed into a slurry or paste for application to the contact part by dispersing (suspending) the flux compound(s) in a liquid, such as water, alcohol, or the like. Optionally, one or more additives, such as a binder, also may be included in the flux application liquid.

Compared with known K—Al—F-based fluxes, a flux that contains Cs tends not to form reaction products when it contacts Mg. However, even if reaction products are produced when a flux that contains Cs reacts with Mg, such reaction products tend to reduce the fluidity of the melted filler material more than the reaction products produced when a K—Al—F-based flux reacts with Mg. Therefore, by performing brazing using a flux that contains Cs applied to the contact part of the hollow structure, brazeability of the contact part can be further improved.

When the total solid content is given as 100 mass %, fluxes according to the present teachings preferably contain 13-58 mass % of Cs. In this case, brazeability of the contact part of the hollow structure can be further improved. If the Cs content in the flux is less than 13 mass %, then the fluidity of the melted (liquid) filler material (filler metal) will decrease owing to the reaction products produced by the reaction between the flux and Mg, which may lead to degradation in brazeability of the contact part. Accordingly, to further improve brazeability of the contact part, the Cs content is preferably set to 13 mass % or more. More preferably, the Cs content is 30 mass % or more.

Better brazing results can be achieved by preferably setting the Cs content in the flux at the upper end of the above-noted range. However, if the Cs content is increased to more than 58 mass %, then it is difficult to obtain further improvements in brazeability commensurate with the increased Cs content.

Brazing Method

In a representative manufacturing method according to the present teachings, first, the clad plates and the inner fin having the above-explained configurations are prepared and the object to be processed (brazed) is assembled therefrom. The object to be processed (i.e. the pre-brazed, heat exchanger intermediate product) comprises: the hollow structure constituted from the above-mentioned clad plates, the inner fin and the flux. Assembly of the object to be processed may be performed in three steps: (1) forming the hollow structure by disposing the clad plates (which were previously bent) adjacent to each other, (2) inserting the inner fin into the interior of the hollow structure, and (3) applying the flux to the contact part of the clad plates of the hollow structure. The order of these steps can be modified as appropriate in accordance with the structure of the object to be processed.

That is, the above-mentioned steps (1)-(3) may be implemented in the order described above or in another order. For example, the flux may instead be pre-applied to the clad plates at locations corresponding to the contact part before forming the clad plates into the shape of the hollow structure, and then the inner fin may be housed in (inserted into) the interior of the hollow structure. In another alternative, the step of preparing the hollow structure and the step of housing (inserting) the inner fin therein can also be performed in parallel (e.g., simultaneously) by holding the inner fin in a position that will correspond to the interior of the hollow structure while bending the clad plates around the inner fin into the shape of the hollow structure.

Natural oxide films are usually present on the surfaces of the clad plates and the inner fin. To reduce the thickness of these natural oxide films prior to brazing, it is preferable to perform an etching treatment on the clad plates and the inner fin prior to the assembly of the clad plates and the inner fin into the object to be processed (brazed). As a result of such an etching treatment, the thinner oxide films can be broken up by the flux, Mg, and the like more easily, thereby further improving brazeability. To sufficiently obtain such an effect, it is preferable that the thickness of the oxide films present on the surfaces be reduced to 5 nm or less by the etching treatment.

Representative methods for etching the clad plates, the inner fin, and the like include immersing them in an acid or an alkali. For example, a diluted solution of hydrofluoric acid, a diluted solution of a mixture of hydrofluoric acid and nitric acid, a diluted solution of a mixture of phosphoric acid and sulfuric acid, or the like can be used as the acid. In addition, a solution of caustic soda (sodium hydroxide) or the like can be used as the alkali.

In addition, it is more preferable to apply a protective oil, which has a thermal decomposition temperature of 380° C. or less in an inert gas, to the surfaces of the clad plates and the inner fin after the etching treatment described above. In this case, because the formation of new natural oxides on the surfaces of the clad plates and the inner fin can be prevented or at least inhibited by the protective oil, the improved brazeability effect achieved by performing the pre-etching treatment can be maintained over a long term.

In addition, if the protective oil is selected such that it decomposes during heating when brazing is performed, then it tends not to remain on the surfaces of the object to be processed at the brazing temperature. Therefore, even if brazing starts while some of the protective oil is still adhered to the surfaces of the object to be processed, there is little risk of the loss of brazeability. Accordingly, by using such a protective oil, the effect of maintaining satisfactory brazeability over a long term can be achieved while eliminating the need for a degreasing treatment prior to brazing, thereby simplifying the overall brazing process.

If the thermal decomposition temperature of the protective oil is higher than 380° C., then there is a risk that the protective oil will scorch the surfaces of the clad plates and the inner fin owing to the heating during brazing and, moreover, that brazeability will degrade.

The amount of flux applied to the contact part when assembling the object to be processed is preferably 0.05-1.0 g/m of the contact part. By setting the flux application amount within this range, brazeability of the contact part on the hollow structure can be improved while avoiding an impairment in external-appearance quality, post-brazing surface treatability, and the like caused by flux residue. It is noted that the flux application amount is commonly indicated by the mass of the flux applied per unit area. However, in the present exemplary manufacturing method, the flux may be applied to the contact part of the hollow structure over a relatively narrow width, and consequently it may be difficult to accurately measure the application surface area. Consequently, the flux application amount is measured according to the mass of the flux per (linear) meter of the contact part.

If the flux application amount per meter of the contact part is less than 0.05 g, then the oxide films present on the surfaces of the contact part cannot be broken up sufficiently, and there is a risk that degradation in brazeability will result. Accordingly, to improve brazeability, it is preferable to set the flux application amount per meter of the contact part to 0.05 g or more, more preferably 0.15 g or more, and yet more preferably 0.25 g or more.

Generally speaking, the greater the flux application amount, the better the brazing results. However, if the flux application amount becomes excessive, then there is a risk that it will become difficult to obtain the effect of improving brazeability commensurate with the amount of flux applied to the object to be processed (brazed). In addition, if the flux application amount is excessively large, then the amount of flux residue adhered to the heat exchanger after brazing will become large, which could lead to an impairment in external-appearance quality, surface treatability, and the like. Therefore, to prevent such problems caused by excessive flux, the flux application amount per meter of the contact part is preferably set to 1.0 g or less.

In addition, the flux application width on the contact part is preferably set to 5 mm or less.

After the object to be processed (brazed) has been assembled, the object to be processed is heated in an inert-gas atmosphere to melt the flux and the filler-material layers. Thereby, the hollow structure and the inner fin can be brazed collectively.

A conventional, well-known inert gas can be used as the inert gas. If the present teachings are applied in a mass-production facility, it is preferable to use nitrogen, argon, or a gas mixture of nitrogen and argon as the inert gas. To improve brazeability, the oxygen concentration in the inert gas is preferably on the low side, more preferably 100 ppm or less, and yet more preferably 50 ppm or less. Such an oxygen concentration can be readily implemented in conventional atmosphere furnaces designed for flux brazing.

The heating temperature during brazing is preferably set to 585° C.-620° C. and more preferably is set to 590° C.-610° C. If the heating temperature is less than 585° C., then the melted filler material (filler metal) may not have sufficient fluidity, which could impair the brazing results. On the other hand, if the heating temperature is more than 620° C., then erosion will occur due to melting of the core layers of the clad plates, portions of the inner fin, or the like, and consequently there will be a risk of brazing failures. In addition, to prevent unnecessary oxidation while the temperature is rising, the temperature-rise rate is preferably relatively fast until the temperature reaches a prescribed heating temperature.

Working Examples

Figure 1:
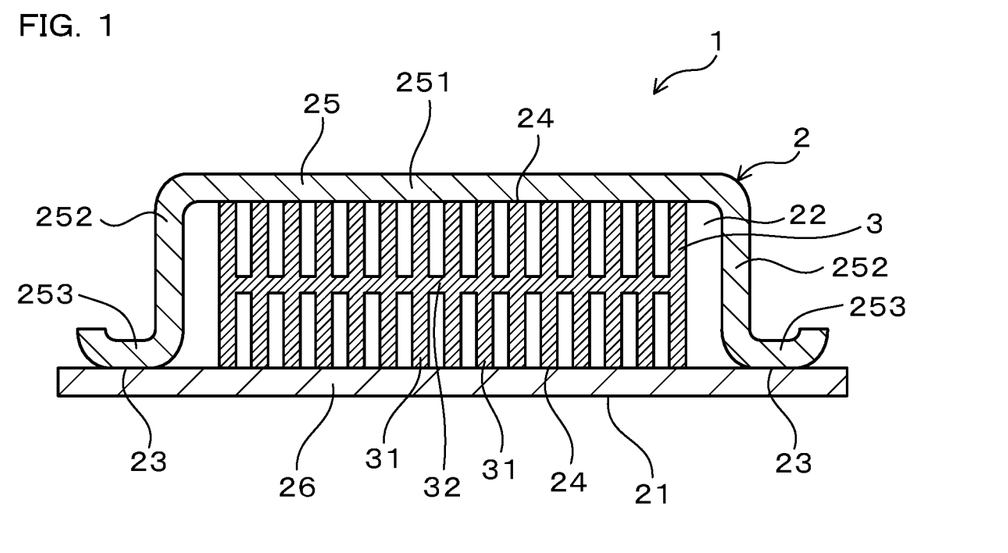
FIG. 1 is a cross-sectional view of the principal parts of a heat exchanger according to a representative embodiment of the present teachings.

A representative heat exchanger and a representative method of manufacturing the same will now be explained with reference to the drawings. As shown in FIG. 1, the heat exchanger 1 of the present example comprises: a jacket 2, in which a heat-generating-element mounting surface 21, on which one or more heat-generating elements is (are) to be mounted, is provided (defined) on an outer surface thereof and a coolant passageway 22, through which a coolant circulates (flows), is provided (defined) in the interior; and an inner fin 3 disposed in the coolant passageway 22. The jacket 2 is preferably composed of a plate material having a chemical composition that contains Mg: 0.40-1.0 mass %, the remainder being Al and unavoidable impurities. However, other elements optionally may be added to the alloy composition of the jacket 2, as was discussed above and will be further discussed below. The inner fin 3 is formed by extruding an aluminum alloy having a chemical composition that preferably contains Si: 0.30-0.70 mass % and Mg: 0.35-0.80 mass %, the remainder being Al and unavoidable impurities. Again, other elements optionally may be added to the alloy composition of the inner fin 3, as was discussed above and will be further discussed below.

Plate materials (25, 26) that constitute the jacket 2 are joined together via a jacket junction 23, which is preferably composed of an Al—Si alloy. In addition, the jacket 2 and the inner fin 3 are joined via fin junctions 24, which are also preferably composed of an Al—Si alloy. In the heat exchanger 1 of the present example, cesium (Cs) is present on the inner surfaces (interior surface layers) of the jacket 2 only from the jacket junction 23 to the end parts of the inner fin 3, that is, to the outermost fin plates 313, as will be further discussed below.

As shown in FIG. 1, the jacket 2 of the present example is constituted from two components (plate materials), namely: a jacket upper part 25 and a jacket lower part 26. The tube-shaped coolant passageway 22 is formed (defined) between the jacket upper part 25 and the jacket lower part 26. The jacket upper part 25 comprises: a top wall 251 which has a substantially oblong (e.g., rectangular) shape; a side wall 252, in which both ends of the top wall 251 in a width direction are bent toward the jacket lower part 26; and a flange 253 formed by folding a tip (edge) portion of the side wall 252. The jacket lower part 26 and the flange 253 are joined via the jacket junction 23. In addition, the heat-generating-element mounting surface 21 is provided (defined) on the outer surface of the jacket lower part 26.

The inner fin 3 of the present example is preferably formed by extruding an aluminum alloy that contains (at least) Si: 0.30-0.70 mass % and Mg: 0.35-0.80 mass %. The inner fin 3 comprises: a plurality of fin plates 31, in which the fin plates 31 have an oblong (e.g., rectangular) shape, are spaced apart from one another, and are lined up in a plate-thickness direction; and a linking part 32, which links adjacent fin plates 31. The inner fin 3 is disposed in the center of the coolant passageway 22, and both the inner surface of the top wall 251 and the inner surface of the jacket lower part 26 are joined via the fin junctions 24.

The heat exchanger 1 can be manufactured, for example, by the manufacturing method that will be described below. First, clad plates 200 are prepared, each having: a core layer A having a chemical composition that contains Mg: 0.40-1.0 mass % (and optionally other elements, as were described above and are shown in Table 1 below), the remainder being Al and unavoidable impurities; and a filler-material layer B that is clad onto at least one surface of the core layer A and preferably has a chemical composition that contains Si: 4.0-13.0 mass % and further contains one, two or more elements selected from Li: 0.0040-0.10 mass %, Be: 0.0040-0.10 mass %, and Bi: 0.010-0.30 mass % (and optionally other elements, as were described above and are shown in Table 2 below), the Mg content being restricted to less than 0.10 mass % and the remainder being Al and unavoidable impurities. It is noted that the inner fin 3 is prepared separately from the clad plates 200. In the present example, single-sided clad plates, in which the filler-material layer B was clad onto only one surface of each core layer A, were prepared.

Figure 2:
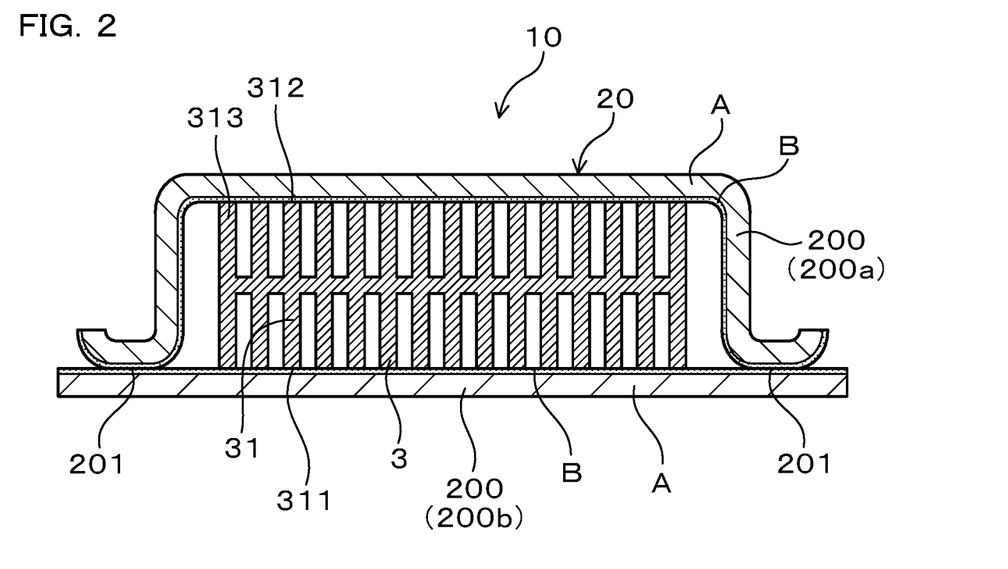
FIG. 2 is a cross-sectional view of the heat exchanger of FIG. 1 prior to brazing.

Next, as shown in FIG. 2, an object to be processed (brazed) 10 is assembled and has: a hollow structure 20, which comprises the clad plates 200 on which the filler-material layers B are disposed on the inner sides, and has a contact part 201, at (along) which the filler-material layers B of the two clad plates 200 contact one another; the inner fin 3, which is housed in the interior of the hollow structure 20; and the flux (not shown in FIG. 2), which contains Cs and is applied only to the contact part 201 and the vicinity thereof. No flux is applied to the inner surfaces of the hollow structure 20 that contact the inner fin 3. It is noted that the contact part 201 may be one continuous or endless contacting region, or may be two or more discrete or discontinuous contacting regions.

The hollow structure 20 of the present example comprises two of the clad plates 200, namely: a first clad plate 200a, which corresponds to the jacket upper part 25, and a second clad plate 200b, which corresponds to the jacket lower part 26. The first clad plate 200a is formed such that the filler-material layer B is disposed on the inner surface side of the hollow structure 20.

Separate from the preparation of the first clad plate 200a and the second clad plate 200b, the flux, which contains Cs, is prepared. The flux of the present example contains a Cs—Al—F-based compound. The flux is prepared in a powder form that is dispersed in water to form a slurry or paste.

After the first clad plate 200a and the second clad plate 200b have been prepared, the flux application liquid (slurry) is applied to portions of the filler-material layers B of these clad plates 200 that correspond to the contact part 201 and the vicinity thereof. After the flux has dried, the inner fin 3 is mounted on a central part of the second clad plate 200b such that the filler-material layer B is brought into surface contact with one end surface 311 of each fin plate 31 in the plate-width direction. Subsequently, the first clad plate 200a is placed on top of the second clad plate 200b so as to cover the inner fin 3, whereby the filler-material layers B of the plates 200a, 200b are brought into contact with one another along the contact part 201, and the filler-material layer B of the first clad plate 200a is brought into surface contact with the other end surface 312 of each fin plate 31 in the plate-width direction. Then, while being held in this state, the first clad plate 200a and the second clad plate 200b are fixed by a jig (not shown), thereby completing the assembly of the object to be processed 10 shown in FIG. 2.

After the object to be processed 10 has been assembled, the hollow structure 20 and the inner fin 3 are collectively brazed by heating the object to be processed 10 in an inert-gas atmosphere to melt the flux and the filler-material layers B. The heat exchanger 1 shown in FIG. 1 was manufactured by the above-described method.

Figure 3:
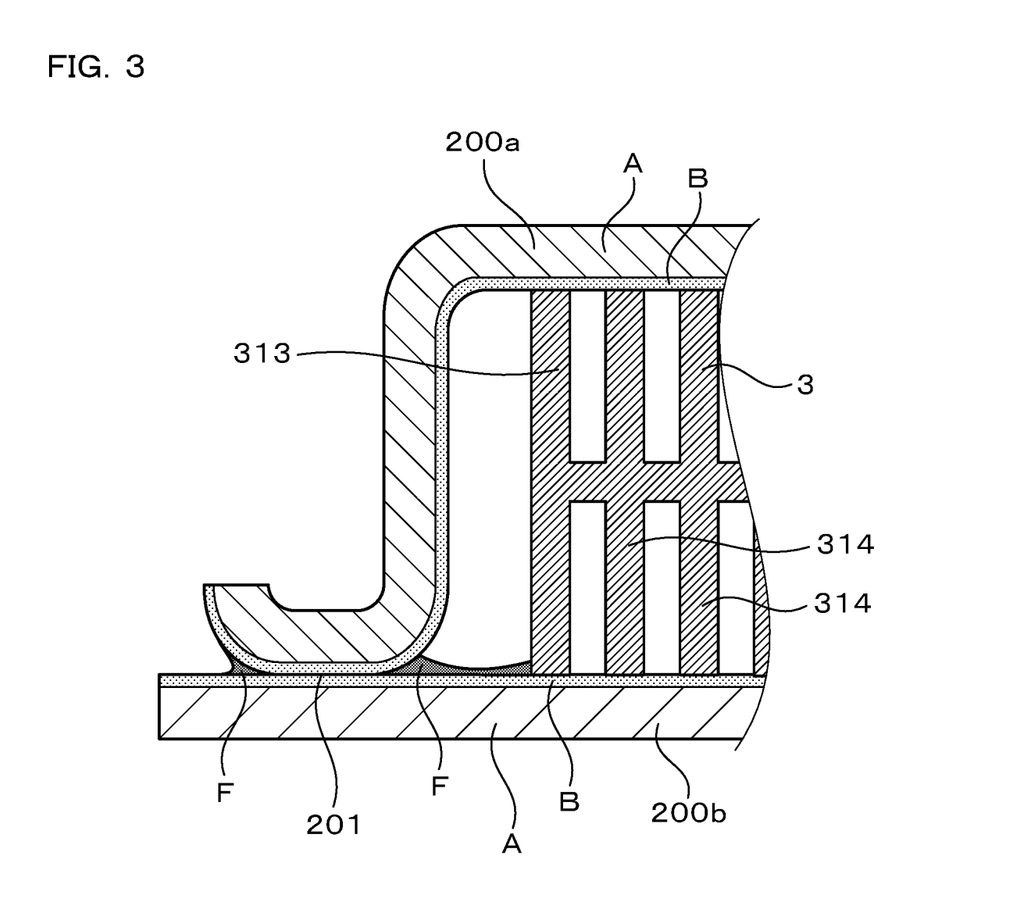
FIG. 3 is an enlarged view of a contact part of two clad plates, and the vicinity thereof, after the heat exchanger shown in FIG. 2 has been subjected to heating to melt a flux (F).

When heating the object to be processed 10 during brazing, the flux melts prior to the filler-material layers B, and the oxide films present on the surfaces of the contact part 201 break up. At this time, as shown in FIG. 3, some of the melted flux F may penetrate (seep, creep) into the interior of the hollow structure 20. The flux F that has penetrated into the interior of the hollow structure 20 reacts, while migrating along the filler-material layers B, with the Mg that has diffused from the core layers A into the filler-material layers B, thereby causing the fluidity of the liquid flux F to gradually decrease. As a result, the flow of the liquid flux F can be stopped before it reaches the fin plate 313 on the outermost side of the inner fin 3.

In addition, the inner fin 3 of the present example is formed from an aluminum alloy that contains Mg (and optionally other elements, as were described above and are shown in Table 3 below). Consequently, even if some of the liquid flux F reaches the outermost fin plate 313, the flow of the liquid flux F can be stanched there (i.e. at the fin plate 313) by the reaction of the flux F with Mg in the fin plate 313.

If the heating is continued and the temperature of the object to be processed 10 is raised after the flux F has melted, then the filler-material layers B melt. At this time, the oxide films present on the surfaces of the contact part 201 have already been broken up by the flux F. Consequently, brazing can be performed at (along) the contact part 201 using the flux F. Furthermore, the oxide films present on the inner surfaces of the clad plates 200 and the surfaces of the fin plates 31 are broken up by the Mg that has diffused from the core layers A into the filler-material layers B and also by the one or more of Li, Be, Bi or the like contained in the filler-material layers B. At this time, as shown in FIG. 3, the flux F that has penetrated from the contact part 201 into the interior of the hollow structure 20 is present only between the contact part 201 and the outermost fin plate 313. Consequently, the fin plates 314, which are on the inner side of the outermost fin plates 313, can be joined with the hollow structure 20 by brazing without being impeded by the flux F.

As described above, by heating the object to be processed 10 in an inert-gas atmosphere, brazing can be performed without using the (any) flux in the interior of the hollow structure 20 where the oxygen concentration is comparatively low, and brazing can be performed using the flux according to the present teachings along the outside edge or periphery of the hollow structure 20 where the oxygen concentration may be comparatively high during the brazing process. As a result, the heat exchanger 1 shown in FIG. 1 can be prepared with strong and durable brazed joints (fillets) both around the exterior of the heat exchanger 1 as well as in the interior of the heat exchanger 1.

As was noted above, the heat exchanger 1 of the present working example comprises the jacket 2 and the inner fin 3, which is disposed in the coolant passageway 22 within the jacket 2. Because the jacket 2 comprises plate materials that are formed from an aluminum alloy that contains Mg, the strength of the jacket 2 is high compared with jackets 2 of previously known heat exchangers that contain little or no Mg. Therefore, the size and wall thickness of the jacket 2 can be reduced while still achieving the required amount strength in the jacket 2. In addition, if the strength of the jacket 2 is further increased, it is possible to prevent or substantially reduce deformation of the jacket 2 caused by thermal expansion during operation of the heat exchanger 1.

Experimental Examples

The following experimental examples are additional examples (both inventive and comparative) of the heat exchanger 1 in which the chemical compositions of the core layer A, the filler-material layer B, and the aluminum alloy that constitutes the inner fin 3 have been variously modified. It is noted that the components of the heat exchangers 1 manufactured in the present examples have the same shape as in the above-described working example. It is noted that the reference numbers and letters used in the following experimental examples are the same as were used in FIG. 1 to FIG. 3 to indicate the same structural elements, etc. as in the working example, except as otherwise explained.

In the present examples, the clad plates 200 and the inner fin 3 were manufactured as described below.

Clad Plates 200

Aluminum alloys (A1-A7) having the chemical compositions listed in Table 1 were cast into ingots. The resulting ingots were heated to 560° C. and a homogenization treatment was performed. Subsequently, both plate surfaces of the ingots were face milled, and thereby plate materials A having a thickness of 45 mm were prepared. Separately, aluminum alloys (alloys B1-B22) having the chemical compositions listed in Table 2 were cast into ingots. The resulting ingots were heated to 500° C. and a homogenization treatment was performed. Subsequently, the ingots were hot rolled, and thereby plate materials B having a thickness of 5 mm were prepared. It is noted that the term "Bal" in Table 1 and Table 2 indicates the remainder or balance of the alloy composition.

The plate materials A and the plate materials B obtained as described above were overlaid in the combinations listed in Table 4 and then heated to 500° C. Subsequently, the plate materials A and the plate materials B were joined by being subjected to clad rolling, and thereby plate materials having a thickness of 3 mm were prepared. These plate materials were subjected to cold rolling and rolled to a thickness of 1.0 mm, after which they were subjected to annealing. The clad plates 200 listed in Table 4 were manufactured by the above-described method. It is noted that the cladding percentage of the filler-material layer B, i.e. the ratio of the plate thickness of the filler-material layer B to the plate thickness of the clad plate 200, was 10%.

Inner Fin 3

Aluminum alloys (C1-C10) having the chemical compositions listed in Table 3 were cast into billets. The resulting billets were subjected to extrusion, and thereby the inner fins 3 were manufactured. It is noted that the term "Bal" in Table 3 also indicates the remainder or balance of the alloy composition. It is noted that the wall thickness of the fin plates 31 and the linking parts 32 was 0.8 mm.

The objects to be processed 10 were assembled, using the same method as described above in the working example, from the clad plates 200 and the inner fins 3 obtained as described above. The combinations of the clad plates 200 and the inner fins 3, and the flux application amount per meter of the contact part (g/m), were prepared as listed in Table 4. It is noted that the length of the objects to be processed 10 was set to 100 mm, and the width was set to 100 mm. In addition, the flux application width was set to 4 mm.

A mixture of a Cs—Al—F-based compound and a K—Al—F-based compound was used as the flux. Application liquids, which include the fluxes, were prepared as follows. First, the Cs—Al—F-based compound and the K—Al—F-compound were mixed, and fluxes were prepared in which the Cs contents were set to the values listed in Table 4. Each of these fluxes was mixed with water at a weight ratio of 1:1, and the flux was suspended in the water, thereby forming a slurry. The flux application liquids were prepared by the above-described method.

In the present example, the flux application amount per meter of the contact part was calculated as follows. First, before applying each flux application liquid to the clad plates 200, the masses of the first clad plate 200a, the second clad plate 200b, and the inner fin 3 were measured in advance. Next, the flux application liquid was applied, using a brush, to prescribed locations of each clad plate 200, and the object to be processed 10 was then assembled. Thereafter, the application liquid was dried, after which the total mass of the object to be processed 10 was measured.

Furthermore, the total mass of the solid content of each flux was calculated by subtracting the total mass of each object to be processed 10, in the state in which the application liquid was dried, from the combined masses of the first clad plate 200a, the second clad plate 200b, and the inner fin 3. The total mass of the solid content obtained as described above was divided by the length of the contact part 201, which was calculated based on the design drawing (engineering drawing or blueprint), and thereby the flux application amount per meter of the contact part was calculated.

After each object to be processed 10 was assembled, the object to be processed 10 was heated inside a heating furnace, wherein nitrogen gas was supplied and the oxygen concentration in the atmosphere was adjusted to 50 ppm or less, and then brazing was performed. While being heated, the temperature of the object to be processed 10 was measured, and the temperature of the object to be processed 10 was raised such that the time until the temperature reached 600° C. was approximately 15 min. Furthermore, after the temperature of the object to be processed 10 had reached 600° C., that temperature was maintained for 3 min. Subsequently, the object to be processed 10 was cooled inside the heating furnace until it reached 200° C., after which it was taken out of the furnace. The heat exchangers 1 (test bodies 1-41) listed in Table 4 were manufactured by the above-described method.

A center part of each obtained test body in the length direction (the extension direction of the coolant passageway 22) was cut, and the shapes of the fillets were observed at the cross section of the jacket junction 23 and the fin junctions 24. The results are listed in Table 4. It is noted that the symbols (letters) entered in the "fillet shape" column in Table 4 indicate the following states of the fillet shape.

A+: Fillets having a continuously uniform size were formed

A: There was variation in the sizes of the fillets, but continuous fillets were formed B: There were breaks in portions of the fillets, and continuous fillets were not formed C: Hardly any fillets were formed, or no fillets were formed at all

TABLE 1

| Alloy Symbol | Chemical Composition (mass %) | | | | | | | | |
|---|---|---|---|---|---|---|---|---|---|
| | Mn | Cu | Si | Fe | Mg | Zn | Ti | Zr | Al |
| A1 | — | — | — | — | 0.2 | — | — | — | Bal |
| A2 | — | — | — | — | 0.4 | — | — | — | Bal |
| A3 | — | — | — | — | 1.0 | — | — | — | Bal |
| A4 | — | — | — | — | 1.2 | — | — | — | Bal |
| A5 | — | 0.40 | 0.50 | 0.30 | 0.4 | — | — | — | Bal |
| A6 | 1.1 | 0.15 | 0.20 | 0.50 | 0.6 | — | — | 0.05 | Bal |
| A7 | — | 0.30 | 0.40 | 0.20 | 0.8 | 0.5 | 0.05 | — | Bal |

TABLE 2

| Alloy Symbol | Chemical Composition (mass %) | | | | | |
|---|---|---|---|---|---|---|
| | Si | Li | Be | Bi | Mg | Al |
| B1 | 10 | 0.002 | — | — | <0.01 | Bal |
| B2 | 10 | 0.004 | — | — | <0.01 | Bal |
| B3 | 10 | 0.10 | — | — | <0.01 | Bal |
| B4 | 10 | 0.20 | — | — | <0.01 | Bal |
| B5 | 10 | — | 0.002 | — | <0.01 | Bal |
| B6 | 10 | — | 0.004 | — | <0.01 | Bal |
| B7 | 10 | — | 0.10 | — | <0.01 | Bal |
| B8 | 10 | — | 0.20 | — | <0.01 | Bal |
| B9 | 10 | — | 0.02 | 0.01 | <0.01 | Bal |
| B10 | 10 | — | 0.01 | 0.10 | <0.01 | Bal |
| B11 | 10 | — | — | 0.005 | <0.01 | Bal |
| B12 | 10 | — | — | 0.01 | <0.01 | Bal |
| B13 | 10 | — | — | 0.03 | <0.01 | Bal |
| B14 | 10 | — | — | 0.30 | <0.01 | Bal |
| B15 | 10 | — | — | 1.0 | <0.01 | Bal |
| B16 | 3.0 | 0.05 | — | — | <0.01 | Bal |
| B17 | 4.0 | 0.05 | — | — | <0.01 | Bal |
| B18 | 7.5 | — | 0.05 | — | <0.01 | Bal |
| B19 | 13 | 0.02 | 0.02 | — | <0.01 | Bal |
| B20 | 15 | — | 0.02 | — | <0.01 | Bal |
| B21 | 10 | 0.01 | — | 0.02 | 0.05 | Bal |
| B22 | 10 | 0.05 | — | — | 0.10 | Bal |

TABLE 3

| Alloy Symbol | Chemical Composition (mass %) | | | | | | | | |
|---|---|---|---|---|---|---|---|---|---|
| | Mn | Cu | Si | Fe | Mg | Zn | Ti | Zr | Al |
| C1 | — | — | 0.25 | — | 0.2 | — | — | — | Bal |
| C2 | — | — | 0.30 | — | 0.35 | — | — | — | Bal |
| C3 | — | — | 0.50 | — | 0.6 | — | — | — | Bal |
| C4 | — | — | 0.70 | — | 0.8 | — | — | — | Bal |
| C5 | — | — | 0.50 | — | 1.0 | — | — | — | Bal |
| C6 | — | — | 0.80 | — | 0.5 | — | — | — | Bal |
| C7 | — | 0.05 | 0.50 | 0.25 | 0.6 | — | — | — | Bal |
| C8 | — | 0.05 | 0.70 | 0.25 | 0.8 | — | — | — | Bal |
| C9 | 1.1 | 0.15 | 0.40 | 0.25 | 0.35 | — | — | 0.05 | Bal |
| C10 | 1.1 | 0.15 | 0.30 | 0.25 | 0.5 | 1.5 | 0.05 | — | Bal |

TABLE 4

| Test Body No. | Clad Plate 200 Core Layer A | Clad Plate 200 Filler-Material Layer B | Inner Fin 3 | Flux Application Amount | Flux Cs Content (mass %) | Fillet Shape Jacket Junction 23 | Fillet Shape Fin Junctions 24 |
|---|---|---|---|---|---|---|---|
| 1 | A2 | B13 | C7 | 0.5 | 58 | A+ | A+ |
| 2 | A3 | B13 | C7 | 0.5 | 58 | A | A+ |
| 3 | A7 | B2 | C7 | 0.5 | 58 | A+ | A |
| 4 | A5 | B3 | C7 | 0.5 | 58 | A+ | A |
| 5 | A7 | B6 | C7 | 0.5 | 58 | A+ | A |
| 6 | A5 | B7 | C7 | 0.5 | 58 | A+ | A |
| 7 | A5 | B9 | C7 | 0.5 | 58 | A+ | A+ |
| 8 | A5 | B10 | C7 | 0.5 | 58 | A+ | A+ |
| 9 | A5 | B12 | C7 | 0.5 | 58 | A+ | A+ |
| 10 | A5 | B13 | C7 | 0.5 | 58 | A+ | A+ |
| 11 | A5 | B14 | C7 | 0.5 | 58 | A+ | A |
| 12 | A6 | B17 | C7 | 0.5 | 58 | A | A |
| 13 | A6 | B18 | C7 | 0.5 | 58 | A+ | A+ |
| 14 | A6 | B19 | C7 | 0.5 | 58 | A | A |
| 15 | A6 | B21 | C7 | 0.5 | 58 | A+ | A+ |
| 16 | A6 | B21 | C2 | 0.5 | 58 | A+ | A+ |
| 17 | A6 | B21 | C3 | 0.5 | 58 | A+ | A+ |
| 18 | A6 | B21 | C4 | 0.5 | 58 | A+ | A+ |
| 19 | A6 | B21 | C8 | 0.5 | 58 | A+ | A+ |
| 20 | A6 | B21 | C9 | 0.5 | 58 | A+ | A+ |
| 21 | A6 | B21 | C10 | 0.5 | 58 | A+ | A+ |
| 22 | A5 | B9 | C7 | 0.05 | 58 | A | A+ |
| 23 | A5 | B9 | C7 | 0.25 | 58 | A+ | A+ |
| 24 | A5 | B9 | C7 | 1.0 | 58 | A+ | A+ |
| 25 | A5 | B9 | C7 | 0.5 | 13 | A | A+ |
| 26 | A5 | B9 | C7 | 0.5 | 30 | A+ | A+ |
| 27 | A5 | B9 | C7 | 0.5 | 50 | A+ | A+ |
| 28 | A5 | B1 | C7 | 0.5 | 58 | A+ | B |
| 29 | A5 | B4 | C7 | 0.5 | 58 | A+ | C |
| 30 | A5 | B5 | C7 | 0.5 | 58 | A+ | B |
| 31 | A5 | B8 | C7 | 0.5 | 58 | A+ | C |
| 32 | A5 | B11 | C7 | 0.5 | 58 | A+ | B |
| 33 | A5 | B15 | C7 | 0.5 | 58 | A+ | C |
| 34 | A6 | B16 | C7 | 0.5 | 58 | B | C |
| 35 | A6 | B20 | C7 | 0.5 | 58 | C | C |
| 36 | A5 | B22 | C7 | 0.5 | 58 | B | A |
| 37 | A6 | B21 | C1 | 0.5 | 58 | A+ | B |
| 38 | A6 | B21 | C5 | 0.5 | 58 | A+ | B |
| 39 | A6 | B21 | C6 | 0.5 | 58 | A+ | B |
| 40 | A1 | B2 | C7 | 0.5 | 58 | A+ | B |
| 41 | A4 | B6 | C7 | 0.5 | 58 | B | B |

As shown in Table 1 to Table 4, test bodies 1-27 were prepared using the clad plates 200 and the inner fins 3 having the chemical compositions in the above-specified ranges. Consequently, in test bodies 1-27, high quality fillets could be formed at both the jacket junctions 23 and the fin junctions 24 and did not result in any practical problems.

Furthermore, in test bodies 1, 7-10, 13, 15-21, 23-24, and 26-27, the amount of Mg in the core layer; the amount of Si, the amount of Li, the amount of Be, the amount of Bi, and the amount of Mg in each filler-material layer B; the flux application amount; and the Cs content in the flux were all in the more preferable ranges. Consequently, fillets having a continuously uniform size could be formed at both the jacket junctions 23 and the fin junctions 24.

In test body 28, because the Li content in each filler-material layer B was low, the oxide films present in the interior of the hollow structure 20 were not sufficiently broken up. Consequently, the formation of the fillets at the fin junctions 24 was unstable.

In test body 29, because the Li content in each filler-material layer B was high, a large amount of Li oxides was formed in the interior of the hollow structure 20. Consequently, fillets were not formed at the fin junctions 24.

In test body 30, because the Be content in each filler-material layer B was low, the oxide films present in the interior of the hollow structure 20 were not sufficiently broken up. Consequently, the formation of the fillets at the fin junctions 24 was unstable.

In test body 31, because the Be content in each filler-material layer B was high, a large amount of Li oxides was formed in the interior of the hollow structure 20. Consequently, fillets were not formed at the fin junctions 24.

In test body 32, because the Bi content in each filler-material layer B was low, the oxide films present in the interior of the hollow structure 20 were not sufficiently broken up. Consequently, the formation of the fillets at the fin junctions 24 was unstable.

In test body 33, because the Bi content in each filler-material layer B was high, the interior of the hollow structure 20 discolored. In addition, in test body 33, fillets were not formed at the fin junctions 24.

In test body 34, because the Si content in each filler-material layer B was low, the amount of the filler material supplied was insufficient. Consequently, the formation of the fillet at the jacket junction 23 was unstable and fillets were not formed at the fin junctions 24.

In test body 35, because the Si content in each filler-material layer B was high, the amount of the filler material supplied became excessive and the amount of the core that dissolved increased. As a result, fillets were not formed at either the jacket junction 23 or the fin junctions 24.

In test body 36, because the Mg content in each filler-material layer B was high, the fluidity of the filler material in the contact part 201 decreased owing to the reaction between Mg and the flux. As a result, the formation of the fillet at the jacket junction 23 was unstable.

In the test body 37, because the Si content in the inner fin 3 was low, the amount of the Si that diffused from the filler-material layers B to the inner fin 3 during heating when brazing was performed became large. Consequently, the amount of Si in the filler-material layers B decreased. In addition, because the Mg content in the inner fin 3 was low in test body 37, the flux could not be stanched by the outermost fin plates 313. Consequently, the flux penetrated as far as the fin plates 314, which are in the interior of the fin plates 313. As a result, in test body 37, the formation of the fillets at the fin junctions 24 was unstable.

In test body 38, because the Mg content in the inner fin 3 was low, a large amount of Mg oxides was formed on the surfaces of the inner fin 3. As a result, the formation of the fillets at the fin junctions 24 was unstable.

In the test body 39, because the Si content in the inner fin 3 was high, the melting point of the inner fin 3 decreased and a portion of the inner fin 3 melted during heating when brazing was performed. As a result, the formation of the fillets at the fin junctions 24 was unstable.

In test body 40, because the Mg content in each core layer A was low, the oxide films present in the interior of the hollow structure 20 were not sufficiently broken up. Consequently, the formation of the fillets at the fin junctions 24 was unstable.

In test body 41, because the Mg content in each core layer A was high, the fluidity of the filler material in the contact part 201 decreased due to the reaction between the Mg and the flux. As a result, the formation of the fillet at the jacket junction 23 was unstable.

It is noted that the present invention is not limited to the working example and experimental examples described above, and the configuration can be modified as appropriate within a range that does not depart from the gist of the present invention. For example, the working example and the experimental examples explained examples in which the hollow structure 20 is assembled from two of the clad plates 200, but the hollow structure 20 may be prepared by forming (bending) one of the clad plates 200 into a tube shape, or by assembling three or more of the clad plates 200.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved heat exchangers and methods of manufacturing the same.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional embodiments of the present teachings include, but are not limited to:

1. A heat exchanger manufacturing method, comprising:
preparing clad plates that comprise: a core layer having a chemical composition that contains Mg: 0.40-1.0 mass %, the remainder being composed of Al and unavoidable impurities; and a filler-material layer having a chemical composition that contains Si: 4.0-13.0 mass % and further contains one or two or more from among Li: 0.0040-0.10 mass %, Be: 0.0040-0.10 mass %, and Bi: 0.01-0.30 mass %, the Mg content being restricted to less than 0.10 mass % and the remainder being composed of Al and unavoidable impurities, and that is clad to at least one surface of the core layer;
preparing an inner fin having a chemical composition that contains Si: 0.30-0.70 mass % and Mg: 0.35-0.80 mass %, the remainder being composed of Al and unavoidable impurities;
assembling an object to be processed comprising: a hollow structure constituted from the clad plates, in which the filler-material layers are disposed on inner sides, and that has a contact part at which the filler-material layers make contact with one another; the inner fin, which is housed in the interior of the hollow structure; and a flux, which contains Cs and is applied to the contact part and the vicinity thereof; and
collectively brazing the hollow structure and the inner fin by heating the object to be processed in an inert-gas atmosphere to melt the flux and the filler-material layer.

2. The heat exchanger manufacturing method according to the above-mentioned embodiment 1, wherein the core layer further contains one or two or more from the group consisting of Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less.

3. The heat exchanger manufacturing method according to the above-mentioned embodiment 1 or 2, wherein the inner fin further contains one or two or more from the group consisting of Mn: 0.050-1.3 mass %, Fe: 1.0 mass % or less, Cu: 0.90 mass % or less, Zn: 6.5 mass % or less, Ti: 0.20 mass % or less, and Zr: 0.50 mass % or less.

4. The heat exchanger manufacturing method according to any one of the above-mentioned embodiments 1-3, wherein the amount of the flux applied is 0.05-1.0 g per meter of the contact part.

5. The heat exchanger manufacturing method according to any one of the above-mentioned embodiments 1-4, wherein the flux contains 13-58 mass % of Cs.

6. A heat exchanger, comprising:
a jacket constituted from plate materials having a chemical composition that contains Mg: 0.40-1.0 mass %, the remainder being composed of Al and unavoidable impurities, wherein a heat-generating-body mounting surface, on which a heat-generating body is mounted, is provided on an outer surface, and a coolant passageway, through which a coolant circulates, is provided in the interior;
an inner fin, which is composed of an aluminum alloy and is disposed in the coolant passageway;
a jacket junction, which is composed of an Al—Si alloy, at which the plate materials of the jacket are joined to one another; and
fin junctions, which are composed of an Al—Si alloy, at which the jacket and the inner fin are joined;
wherein Cs is present on an inner surface of the jacket only from the jacket junction to the inner fin.

7. The heat exchanger according to the above-mentioned embodiment 6, wherein the plate materials further contain one or two or more from the group consisting of Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less.

8. The heat exchanger according to the above-mentioned embodiment 6 or 7, wherein the inner fin is composed of an aluminum alloy having a chemical composition that contains Si: 0.30-0.70 mass % and Mg: 0.35-0.80 mass %, the remainder being composed of Al and unavoidable impurities.

9. The heat exchanger according to the above-mentioned embodiment 8, wherein the inner fin further contains one or two or more from the group consisting of Mn: 0.050-1.3 mass %, Fe: 1.0 mass % or less, Cu: 0.90 mass % or less, Zn: 6.5 mass % or less, Ti: 0.20 mass % or less, and Zr: 0.50 mass % or less.

We claim:

1. A heat exchanger, comprising:
a jacket comprising at least two plate materials joined together along at least one jacket junction, the at least two plate materials comprising an aluminum alloy and the at least one jacket junction comprising an Al—Si alloy, wherein a surface configured to mount a heat-generating element is defined on an outer surface of the jacket, and a coolant passageway is defined in an interior of the jacket; and
an inner fin disposed in the coolant passageway, the inner fin being composed of an aluminum alloy and being joined to the jacket at a plurality of fin junctions, each fin junction comprising an Al—Si alloy;
wherein:

a core layer of the at least two plate materials contains Mg: 0.4-0.8 mass %;

the Al—Si alloy of the fin junctions and the jacket junction contains Si: 7.5-13 mass %, Mg: less than 0.10 mass %, and at least one selected from the group consisting of: (i) Be: 0.010-0.050 mass %, (ii) Bi: 0.010-0.10 mass %, (iii) Be: 0.004-0.020 mass % and Bi: 0.010-0.10 mass % and (iv) Li: 0.010-0.050 mass % and Bi: 0.010-0.10 mass %;

the inner fin is composed of an aluminum alloy that contains Si: 0.30-0.70 mass % and Mg: 0.35-0.80 mass %; and cesium is present on an inner surface of the jacket only from the jacket junction to the inner fin.

2. The heat exchanger according to claim 1, wherein the aluminum alloy of the at least two plate materials further contains one, two or more elements selected from the group consisting of Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less.

3. The heat exchanger according to claim 1, wherein the aluminum alloy of the at least two plate materials contains Mg: 0.4-0.6 mass %.

4. The heat exchanger according to claim 3, wherein the aluminum alloy of the inner fin further contains one, two or more elements selected from the group consisting of Mn: 0.050-1.3 mass %, Fe: 1.0 mass % or less, Cu: 0.90 mass % or less, Zn: 6.5 mass % or less, Ti: 0.20 mass % or less, and Zr: 0.50 mass % or less.

5. The heat exchanger according to claim 1, wherein the Al—Si alloy of the fin junctions and the jacket junction contains Si: 7.5-13 mass %, Mg: less than 0.10 mass %, Be: 0.004-0.020 mass % and Bi: 0.010-0.10 mass %.

6. The heat exchanger according to claim 1, wherein the inner fin is joined to the jacket at both ends of the inner fin in a fin width direction of the inner fin.

7. A heat exchanger produced according to a process comprising:

assembling an object to be processed by disposing the inner fin within an interior of a hollow structure formed from at least two clad plates that each have a filler metal layer disposed on a side thereof that faces the interior of the hollow structure and contacts the inner fin; and heating the object to be processed in an inert-gas atmosphere to melt the filler metal layer and join the hollow structure to the inner fin and to join the at least two clad plates to each other along a contact part, thereby forming the jacket;

wherein:

the at least two clad plates each comprise the filler metal layer clad onto a core layer, the core layer is composed of an aluminum alloy that contains Mg: 0.4-0.8 mass %;

the filler metal layer is composed of an aluminum alloy that contains Si: 7.5-13 mass %, less than 0.10 mass % Mg, and at least one selected from the group consisting of: (i) Be: 0.010-0.050 mass %, (ii) Bi: 0.010-0.10 mass %, (iii) Be: 0.004-0.020 mass % and Bi: 0.010-0.10 mass % and (iv) Li: 0.010-0.050 mass % and Bi: 0.010-0.10 mass %;

the inner fin is composed of an aluminum alloy that contains Si: 0.30-0.70 mass % and Mg: 0.35-0.80 mass %; and a flux that contains at least 30 mass % cesium is applied to the contact part in an amount of 0.25-1.0 grams per meter of the contact part, and to the vicinity thereof, of the at least two clad plates prior to the brazing, wherein the flux melts during the heating step to break up oxide films on surfaces of the at least two clad plates along the contact part.

8. The heat exchanger according to claim 7, wherein the aluminum alloy of the at least two plate materials further contains one, two or more elements selected from the group consisting of Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less.

9. The heat exchanger according to claim 7, wherein the aluminum alloy of the at least two plate materials contains Mg: 0.4-0.6 mass %.

10. The heat exchanger according to claim 9, wherein the aluminum alloy of the inner fin further contains one, two or more elements selected from the group consisting of Mn: 0.050-1.3 mass %, Fe: 1.0 mass % or less, Cu: 0.90 mass % or less, Zn: 6.5 mass % or less, Ti: 0.20 mass % or less, and Zr: 0.50 mass % or less.

11. The heat exchanger according to claim 7, wherein the Al—Si alloy of the fin junctions and the jacket junction contains Si: 7.5-13 mass %, Mg: less than 0.10 mass %, Be: 0.004-0.020 mass % and Bi: 0.010-0.10 mass %.

12. The heat exchanger according to claim 7, wherein the inner fin is joined to the jacket at both ends of the inner fin in a fin width direction of the inner fin.

13. A heat exchanger produced according to a process comprising:

assembling an object to be processed by disposing the inner fin within an interior of a hollow structure formed from at least two clad plates that each have a filler metal layer disposed on a side thereof that faces the interior of the hollow structure and contacts the inner fin; and heating the object to be processed in an inert-gas atmosphere to melt the filler metal layers and join the hollow structure to the inner fin and to join the at least two clad plates to each other along a contact part, thereby forming the jacket;

wherein:

the at least two clad plates each comprise the filler metal layer clad onto a core layer, the core layer is an aluminum alloy that contains Mg: 0.4-0.8 mass %;

the filler metal layer is an aluminum alloy that contains Si: 7.5-13 mass %, Mg: less than 0.10 mass %, and at least one selected from the group consisting of: (i) Be: 0.010-0.050 mass %, (ii) Bi: 0.010-0.10 mass %, (iii) Be: 0.004-0.020 mass % and Bi: 0.010-0.10 mass % and (iv) Li: 0.010-0.050 mass % and Bi: 0.010-0.10 mass %;

the inner fin is an aluminum alloy that contains Si: 0.30-0.70 mass % and Mg: 0.35-0.80 mass %; and a flux that contains at least 30 mass % cesium is applied to the contact part in an amount of 0.25-1.0 grams per meter of the contact part, and to the vicinity thereof, of the at least two clad plates prior to the brazing, wherein the flux melts during the heating step to break up oxide films on surfaces of the at least two clad plates along the contact part.

14. The heat exchanger according to claim 13, wherein the aluminum alloy of the at least two plate materials further contains one, two or more elements selected from the group consisting of Mn: 0.050-1.3 mass %, Si: 1.0 mass % or less, Fe: 1.0 mass % or less, Cu: 0.90 mass % or less, Zn: 6.5 mass % or less, Ti: 0.20 mass % or less, and Zr: 0.50 mass % or less.

15. The heat exchanger according to claim 13, wherein the aluminum alloy of the at least two plate materials contains Mg: 0.4-0.6 mass %.

16. The heat exchanger according to claim 15, wherein the aluminum alloy of the inner fin further contains one, two or more elements selected from the group consisting of Mn: 0.050-1.3 mass %, Fe: 1.0 mass % or less, Cu: 0.90 mass % or less, Zn: 6.5 mass % or less, Ti: 0.20 mass % or less, and Zr: 0.50 mass % or less.

17. The heat exchanger according to claim 13, wherein the Al—Si alloy of the fin junctions and the jacket junction contains Si: 7.5-13 mass %, Mg: less than 0.10 mass %, Be: 0.004-0.020 mass % and Bi: 0.010-0.10 mass %.

18. The heat exchanger according to claim 13, wherein the inner fin is joined to the jacket at both ends of the inner fin in a fin width direction of the inner fin.

\* \* \* \* \*